(12) United States Patent
Budnicki et al.

(10) Patent No.: US 11,493,450 B2
(45) Date of Patent: Nov. 8, 2022

(54) INTERFEROMETRIC FIBER OPTIC SENSOR, FIBER OPTIC PROBE AND METHOD OF DETECTION OF CHEMICAL SUBSTANCE

(71) Applicant: INPHOTECH SP. Z O.O, Ołtarzew (PL)

(72) Inventors: Dawid Budnicki, Saniki (PL); Mariusz Makara, Lublin (PL); Marek Napierala, Warsaw (PL); Tomasz Nasilowski, Warsaw (PL); Krzysztof Poturaj, Lublin (PL); Lukasz Szostkiewicz, Torun (PL); Krzysztof Wilczynski, Wegorzewo (PL); Karol Wysokinski, Gdynia (PL)

(73) Assignee: INPHOTECH SP. Z O.O, Ołtarzew (PL)

( * ) Notice: Subject to any disclaimer, the term of this patent is extended or adjusted under 35 U.S.C. 154(b) by 0 days.

(21) Appl. No.: 17/123,487

(22) Filed: Dec. 16, 2020

(65) Prior Publication Data
US 2021/0102901 A1    Apr. 8, 2021

Related U.S. Application Data

(63) Continuation of application No. PCT/IB2019/050062, filed on Jun. 17, 2019.

(51) Int. Cl.
*G01N 21/77* (2006.01)
*G01B 11/06* (2006.01)
*G02B 6/02* (2006.01)

(52) U.S. Cl.
CPC ..... *G01N 21/7746* (2013.01); *G01B 11/0675* (2013.01); *G02B 6/02042* (2013.01); *G01N 2021/7779* (2013.01)

(58) Field of Classification Search
CPC ........... G01N 21/7746; G01N 21/7703; G01N 2021/7779; G02B 6/02042; G02B 6/2808; G01B 11/0675
See application file for complete search history.

(56) References Cited

U.S. PATENT DOCUMENTS 4,753,530 A * 6/1988 Knight ................. G01N 21/474
356/73
4,945,230 A * 7/1990 Saaski ................ G01N 21/7703
374/E11.018

(Continued)

*Primary Examiner* — Sang H Nguyen
(74) *Attorney, Agent, or Firm* — The Concept Law Group, PA; Scott D. Smiley; Scott M. Garrett

(57) ABSTRACT

Disclosed is an interferometric fiber optic sensor for detecting chemical substances. A light source a detector are connected to a light dividing element in an optical path with an optical fiber segment. The optical fiber segment is further optically coupled with a measuring element across a residual cavity. The measuring element further has a face adapted to be exposed to a test substance that may contain a chemical substance to be detected. The optical fiber segment and the measuring element can be held together so that there is only the residual cavity between them. The optical fiber segment is contained, at least along part of its length, within a capillary. A first end part of the capillary is joined with the measuring element while another portion of the capillary is joined or clenched on the optical fiber segment, so that the capillary, the optical fiber segment and the measuring element together form a fiber optic measuring probe as a part of the optical path with the light source and detector.

18 Claims, 5 Drawing Sheets

(56) References Cited

U.S. PATENT DOCUMENTS

| | | | | |
|---|---|---|---|---|
| 5,426,713 | A * | 6/1995 | VonBargen | G01N 21/474 |
| | | | | 250/227.29 |
| 5,534,997 | A * | 7/1996 | Schrader | G01N 21/65 |
| | | | | 385/12 |
| 5,585,634 | A * | 12/1996 | Stevenson | G01N 21/431 |
| | | | | 250/341.8 |
| 5,625,459 | A * | 4/1997 | Driver | G02B 6/2817 |
| | | | | 250/227.24 |
| 5,640,470 | A * | 6/1997 | Iyer | G02B 6/241 |
| | | | | 422/82.07 |
| 6,069,686 | A * | 5/2000 | Wang | G01D 5/266 |
| | | | | 374/E11.015 |
| 6,563,992 | B1 * | 5/2003 | Doyle | G02B 6/262 |
| | | | | 385/115 |
| 7,359,060 | B2 * | 4/2008 | Ebersole | G01N 21/31 |
| | | | | 356/477 |
| 2005/0185189 | A1 * | 8/2005 | Grossman | G01K 11/3206 |
| | | | | 374/E11.016 |
| 2005/0254062 | A1 * | 11/2005 | Tan | G01N 21/7703 |
| | | | | 356/480 |
| 2008/0291456 | A1 * | 11/2008 | Ghislain | G01N 29/032 |
| | | | | 356/450 |

* cited by examiner

INTERFEROMETRIC FIBER OPTIC SENSOR, FIBER OPTIC PROBE AND METHOD OF DETECTION OF CHEMICAL SUBSTANCE

CROSS-REFERENCE TO RELATED APPLICATION

This application claims priority to PCT application PCT/IB 2019/055062, filed Jun. 17, 2019, and through that application to Polish patent application no. PL425972, filed Jun. 18, 2018, the entireties of which are hereby incorporated by reference.

FIELD OF THE INVENTION

The invention relates generally to optical interferometers, and more particularly to an interferometric fiber optic sensor, fiber optic probe, and method of detection of chemical substance using the interferometric fiber optic sensor with a fiber optic probe.

BACKGROUND OF THE INVENTION

International patent application WO2018106134 discloses an interferometric fiber optic sensor including a Michelson interferometer with one arm covered with active substance adapted to interact with a substance to be detected. A result of this interaction is a change of thickness or optical thickness of the active substance, refractive index, or optical attenuation at the end of measurement arm. Such an interferometric fiber optic sensor can be used to detect presence of a substance in the environment surrounding measurement arm. In particular, the measurement arm can be immersed in the unknown test substance to detect if the test substance includes a specific substance or substances. The active substance can be selected so that it reacts with only one other substance to be detected or a group of substances to be detected. A method of detection includes observation of interference fringes before and after contact with a test environment or unknown substance. Presence of the specific substance being tested for is detected if a particular shift of interference fringes is detected or observed.

In the state of the art there are also known other configurations of interferometric sensors. The Fabry-Perot interferometer is one of the so called multibeam interferometers, and is used for examination of light waves and utilizes a phenomenon of multiple reflections of a light beam between two parallel and partially transparent mirrors.

An example of a Fabry-Perot interferometer is the fuel level sensor disclosed in European patent application EP 3054272, in which an optical cavity is made on the optical fiber with a semiconductor material, e.g. gallium arsenide. An optical cavity is attached to a lower surface of a diaphragm and the change of dimensions resulting from changes of pressure on the diaphragm on the cavity make it possible to interpret of the result as a state of fuel reserve.

US patent application no US2005254062 discloses an interferometric sensor and method for detecting the presence or amount or rate of binding of an analyte. The sensor works in a Fabry-Perrot configuration and has a light source, a detector with an optical path between that has a light dividing element and measuring element probe in which an optical fiber delivers light to a first and second optical element, via an air gap. A second optical element is covered with a substance capable of binding with analyte. The analyte is analyzed by observation of the spectrum of reflected light. This reference discloses multiple applications allowing detection and measurements of particular substances—analytes, in particular antigens. The disclosure is not devoid of disadvantages. It requires high precision of manufacturing of the first and the second optical element and—particularly—precise definition of air gap. It is a nonoptional requirement for the probes to be repeatable and for the spectral changes to be properly observed. This comes at the cost of using a complicated mathematical model. Replacement of the probe is also a problem as is the manufacturing thereof.

Sensors known in the art are difficult to make in mass production, have parameters difficult to repeat, and are a bit cumbersome to use with small samples. On the other hand industrial sensors like fluid level sensors give only limited information about a certain condition that has been met. Consequently there is a need for sensor that can be applied in large amounts of repeatable testing and examination. It is an object of the invention to provide interferometeric fiber optic sensor, fiber optic probe and method of using thereof devoid of the disadvantages of the state of the art mentioned above.

SUMMARY OF THE INVENTION

In accordance with some embodiments of the inventive disclosure, there is provided an interferometric fiber optic sensor for detecting chemical substances that includes a light source, a detector, and an optical path arranged between the light source and the detector. It further includes a light dividing element to which the detector and the light source are connected, as well as an optical fiber segment, with a measuring element including a resonant cavity having a face adapted to come into contact with a chemical substance to be detected. The optical fiber segment and the measuring element are squeezed together so that there is only a residual cavity between them. The optical fiber segment is at least, along part of its length, contained within a capillary. A first ending part of the capillary is joined with the measuring element while another portion of the capillary is clenched on the optical fiber segment so that the capillary, the optical fiber segment, and the measuring element together constitute a fiber optic measuring probe as a part of the optical path. The capillary has a length of at least 5 mm. A benefit of such construction of the sensor is that the residual cavity can be neglected in calculations. It has a low impact on the measurement results and is easy to manufacture in a stable and repeatable manner. The length of the capillary being 5 mm or greater enables shifting a point of clenching on the optical fibre segment away from the residual cavity far enough for its parameters not to be affected in the process. Consequently, the sensor according to the invention can be considered as having a single measurement resonant cavity constituted by the surfaces of the faces of the measuring element. The result is a linear measurement and simple interpretation of measurement results. A probe with a capillary can be easily replaced by cutting and welding a new one or using a fiber optic connectors. The sensor is applicable, in particular, but not only, to detect substances within a group including acetone, refrigerants, ethanol vapours, hydrochloric acid, poly (allylamine hydrochloride), allylamines, proteins, biomarkers and antigens. An additional advantage of the inventive disclosure is that a substance to be detected interacts with a face of measuring element in front of the optical fiber. This configuration improves measurement dynamics in comparison to the probes in which the substance to be detected interacts with side surface of the optical fiber or measuring element.

Advantageously a ratio between an optical length a·$n_1$ of the residual cavity and optical length b·$n_2$ of the measuring element falls into a range of 0 to 0.4. Using a ratio between the length of resonant cavity and residual cavity within a range of 0 to 0.4 results in high frequency of interference fringes and simplifies analysis. This ratio makes it easier to use a single cavity model in the analysis. A spectrum of the signal reflected from the residual cavity is far wider than the spectrum of the measurement signal originating from the cavity that is formed by the measuring element. In the disclosed mathematical model change in spectra corresponds to the multiplication of two sinusoidal signals having different periods. Using the ratio in this range also makes it easier to determine the impact of the spectrum originating from the residual cavity constant and neglect it from the measurement.

Advantageously the measuring element has face at least partly covered with a material that is adhesive to the substance to be detected. This configuration makes it easy to capture the sample of the substance to be detected.

Alternatively the measuring element has face at least partly covered with material that loses its adhesiveness when exposed to the substance to be detected. In this configuration it is possible to detect exposure of the face of the measuring element to the unknown substance and consequently to detect the test substance in the unknown substance.

Alternatively the measuring element has a face at least partly covered with material that changes its optical parameters when exposed to the substance to be detected. The use of multiple covers each with a material that interacts with a respective one of several substances to be detected makes it possible to detect multiple substances in single measurement with the same detector and light source. Attachment/detachment of the material or change of parameters of the material on the face of measuring element or change of the parameters of the element itself after exposure to the external factors changes a length of the optical path in the interferometer. As a result a shift of interference fringes can be observed.

The measuring element can be a tile made of a material selected from a group including glass, silica glass $SiO_2$, lead glass, ZBLAN glass, and polymers.

The optical fiber segment can be a single mode fiber within an operating range of the detector.

An end of the optical fiber segment inside the capillary is can be oblique and inclined by an angle within a range of 4° to 20° with respect to the axis of the optical fiber segment. The best results were obtained in the range of 7° to 8°.

A first surface of optical fiber segment confining residual cavity from the first side has a reflection coefficient $R_1$ and a second surface of a measuring element confining the residual cavity from the opposite side has a reflection coefficient $R_2$ and reflection coefficients advantageously meet condition $$\frac{R_1}{R_2} \le 0.5$$

Advantageously, the optical fiber segment can be a multicore fiber segment that is connected to a fan-in/fan-out being in the optical path, wherein the interferometer has a first light source and a first detector connected with the fan-in/fan-out device via a first light dividing element, and a second light source and a second detector connected to the fan-in/fan-out device via a second light dividing element. This configuration makes it possible to simultaneously observe shifts on different wavelengths and improvement of sensitivity and specificity of detection or simultaneous detection of two different substances.

Advantageously the interferometer further can have a third light source and a third detector connected to the fan-in/fan-out device via a third light dividing element. The use of a greater number of sources and detectors operating at various wavelengths further improves sensitivity and specificity, yet is connected with high complication of the sensor.

At least one light source can selected from a group including:
- a supercontinuum source;
- a halogen lamp emitting light within a wavelength range of 400-700 nm;
- a superluminescent diode having a central wavelength of 1310 nm;
- a superluminescent diode having a central wavelength of 1400 nm;
- a superluminescent diode having a central wavelength of 1450 nm;
- a superluminescent diode having a central wavelength of 1550 nm; and
- a narrowband light source having a central wavelength within a range 1310 to 1550 nm tunable within a range of 20 nm or wider.

Generally good results were obtained with sources working within a range of wavelength of 400-1600 nm. Having selected a source and a mechanism of interaction for the face of the measuring element given a substance to be detected it is possible to easily select a length of the measuring element to obtain fringe at a desired wavelength corresponding to a selected source so that a shift of the fringe can be easily observed.

A fiber optic measuring probe can include an optical fiber segment and a measuring element having a face for contacting substances such that the optical fiber segment and the measuring element are squeezed together so that there is only a residual cavity between them, and an optical fiber segment is provided at least along part of its length and contained within a capillary. The first end of the capillary is joined with the measuring element while another portion of the capillary can be clenched on the optical fiber segment. A probe according to the invention can be located remote from the light source and detector. It is easily replaceable, and it can be easily sterilized and adapted to subsequent use.

Advantageously, a ratio between optical length a•$n_1$ of the residual cavity and optical length b•$n_2$ of the measuring element falls into a range of 0 to 0.4. This ratio results in a high frequency of interference fringes and simplifies analysis. This ratio makes it easier to use a single cavity model in the analysis. The measurement fringes are far narrower than the ones originating from the residual cavity.

Advantageously the measuring element has face at least partly covered with substance adhesive to the substance to be detected. This configuration makes it easy to capture the sample of the substance to be detected.

Alternatively the measuring element has face at least partly covered with material that loses its adhesiveness when exposed to the substance to be detected. In this configuration it is possible to detect the result of exposure of the face of the measuring element to the predefined substance and consequently to detect the substance itself.

Alternatively the measuring element has face at least partly covered with material that changes its optical parameters when exposed to the substance to be detected. Several covers with multiple materials that each interact with a respective one of the particular substances to be detected makes it possible to detect multiple substances in single measurement with the same detector and light source. Attachment/detachment of a substance to be detected can change parameters of the material(s) on the face of measuring element(s) or change of the parameters of the element itself after exposure to the external factors changes length of the optical path in the interferometer. As a result a shift of interference fringes can be observed.

A measuring element can be a tile made of material selected from a group including glass, silica glass, lead glass, ZBLAN glass and polymers.

An end of the optical fiber segment inside the capillary is can be oblique and inclined by an angle within a range of 4° to 20° with respect to the axis of the optical fiber segment. A first surface of optical fiber segment forms a residual cavity at a first side and has a reflection coefficient $R_1$ and a second surface of a measuring element forms the residual cavity from the opposite side and has a reflection coefficient $R_2$ where the reflection coefficients meet the condition $$\frac{R_1}{R_2} \leq 0.5$$

Advantageously, when a difference between the refraction index of the medium within capillary $n_1$ and refraction index of material of measurement element $n_2$ is greater than 30% i.e.:

$$\frac{|n_2 - n_1|}{n_1} \geq 0.3$$

A fiber optic measuring probe can have a connector provided on an end of the optical fiber segment, opposite that the measuring element is located.

An optical fiber segment in the measurement probe can have more than one core, which enables use of the probe within an interferometer with multiple detectors and/or sources providing better sensitivity and specificity.

A method of detecting a chemical substance using an interferometer having an optical path with a detector, a light source, and a fiber optic measuring probe included in the optical path, guiding light to a substance to be detected, in which the substance is considered as detected if a shift of a predefined interference fringe is observed on the detector. As the measurement element constitutes a resonant cavity, it is possible to register interference fringes in the wavelength domain. When, on the external surface of the cavity, a substance is attached, or a thickness of the substance that is already attached is increased, then interference fringes are shifted as a result of the greater resulting wavelength. The size of the shift can be used to determine the thickness change. Alternatively, if a layer is detached the interference fringes move to indicate shorter wavelengths, and reduction of thickness can be inferred.

Although the invention is illustrated and described herein as embodied in an interferometric device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

Embodiments of the invention have been described below in detail, with reference to the following figures, wherein.

DETAILED DESCRIPTION

Figure 1A:
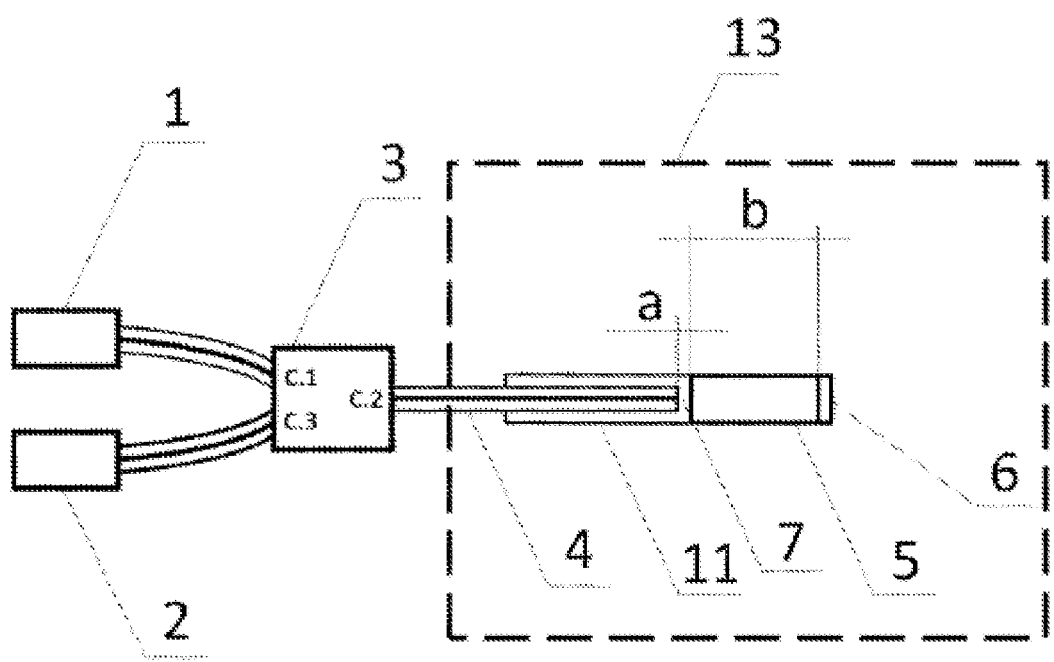
FIG. 1A shows a block diagram of an interferometric fiber optic sensors according to a first, a second and a third embodiment of the invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

EXAMPLE 1

A block diagram of an interferometer in accordance with some embodiments is presented in FIG. 1A. Light source 1 is a superluminescent diode that can have a central wavelength of 1400 nm and a width of 50 nm, and is connected through a single mode optical fiber to the first port C.1 of a circulator 3 that acts as a dividing element. A measuring probe 13, in accordance with some embodiments, is connected to the second circulator port C.2 of the circulator 3 by a single-mode fiber end 4. In the structure of the measuring probe 13, the other end of the optical fiber 4 is enclosed in a silica glass capillary 11 and is pushed into capillary 11 to the measuring element 5 which is attached to the capillary 11, such as by splicing.

Alternatively, the capillary 11 can be clamped on the measuring element 5 in a way that allows light to pass through to the measuring element 5.

In some embodiments the end of the optical fiber 4 located in the capillary can be cut at an angle of eight degrees. As a result, between the end of optical fiber 4 and the measuring element 5 there is an air gap forming a residual cavity 7 with an effective width a from 0-2 μm. Measuring element 5 can have a length of 20 μm.

Further tests has shown that effective attenuation of reflected signals can be obtained in a range of angles from 4° to 20° at the end of the optical fiber 4 proximate to the measuring element 5.

A detector 2 can be an optical spectrum analyzer in some embodiments and is coupled to port C.3 of the circulator 3.

Light from source 1 passes through the dividing element 3 (e.g. the circulator) into optical fiber 4, where, after passing through an air gap of a width "a," the light is incident on the measuring element 5 at face 6 at an end of the measuring element 5. This arrangement is consistent with a Fabry-Perot interferometer. The detector 2 allows one to observe interference fringes in the spectral domain. The shift of fringes and/or contrast depends on changes of the parameters of the cavities formed along the optical path. In practice, the change at the surface at the boundary of the cavity established between the face 6 and the opposite end of the measuring element 5 is useful in measurements. The best results are obtained if the optical path contains only one cavity. Each connection, and each media border introduces an additional cavity. In the construction of the interferometer according to the invention, the number of cavities is limited. The residual cavity 7 is negligible due to its small size. Additionally, its contribution to the measurement result is limited thanks to the oblique cut of the fiber section 4 and providing an adequate ratio of reflection coefficients at the boundaries of the cavity:

$$\frac{R_1}{R_2} \leq 0.5$$

Where :
$R_1$ is the reflection factor at the end of the optical fiber;
$R_2$ is the reflection coefficient from the surface of the measuring element facing the capillary.

The difference between the refractive indices $n_1$ of the medium in the capillary and $n_2$ of the material of the measuring element is controlled to be greater than 30%, i.e.:

$$\frac{|n_2 - n_1|}{n_1} \geq 0.3$$

which allows for better dynamics of measurement.

Figure 2A:
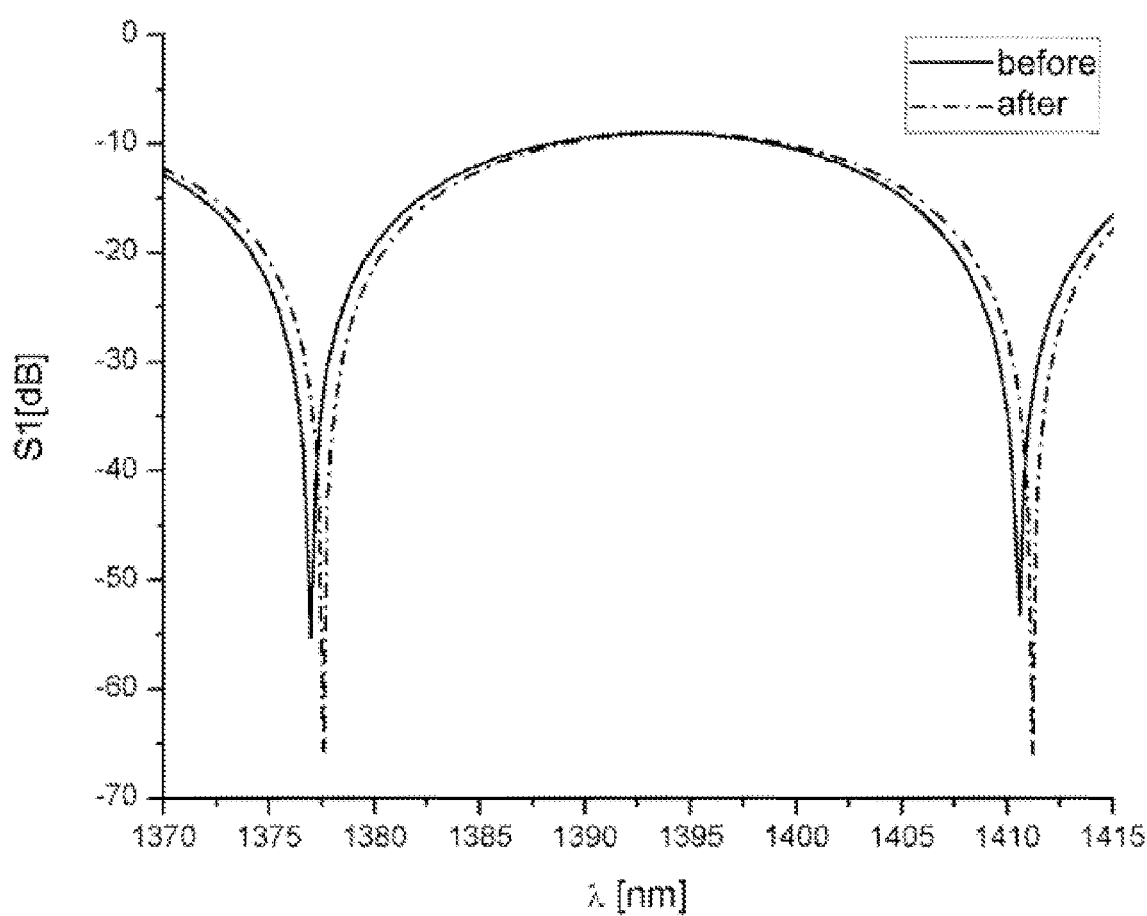
FIGS. 2A-2B show a shift of interferometric fringes due to exposition to substance under test in the first embodiment of the invention.
Figure 2B:
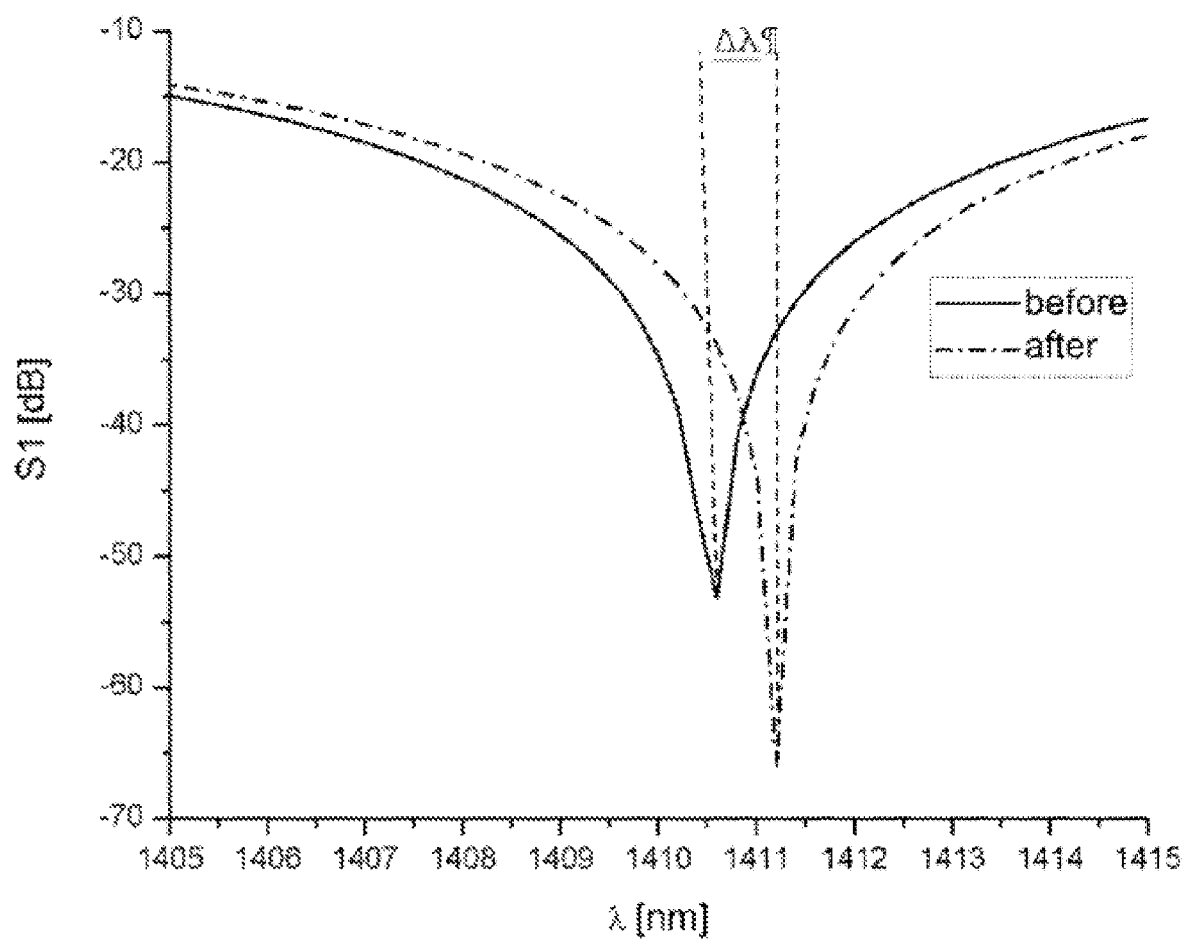

The measuring element 5 is a tile in the form of a glass cylinder that can have a height of 20 μm. The face 6 of the measuring element 5 can be coated with a perfluorinated polymer having a refractive index of approximately 1.33. The coating is provided by immersing measuring element 5 in a polymer solution. As a result of exposing the face 6 to certain substances (e.g. refrigerants, which are compounds of carbon, chlorine and fluorine, like 1,1,2-trichloro-1,2,2-trifluoroethane) the layer of polymer swells. In this configuration swelling contributes to a change of the coating thickness byin some cases, 10 nm, which corresponds to shift of interference fringes of light having a wavelength of 1410 nm by 0.6 nm. As shown in FIGS. 2A-2B, which graph the reflection coefficient S1 as a function of wavelength before and after exposure of the measuring element, including the coating, to refrigerants, there can be seen a shift in wavelength Δλ.

The change in thickness of the layer of material covering face 6 can be determined based on the change in frequency indicated in FIGS. 2A-2B.

The first step is to measure the thickness of the measuring element 5 by determining the difference in wavelength for neighboring interference fringes during the measurement before exposure to the substance being tested. These fringes are shown in FIG. 2A. Thus, the calibration of the interferometer is carried out by determining the difference of optical paths in the interferometer and considering the refractive index for the cavity formed by the surfaces of the measuring element 5 and taking into account that the optical signal passes through the cavity twice.

Next, the face 6, including the layer of active material, is exposed to the test substance, and one of the interference fringes is analyzed; a difference in wavelength corresponding to the fringes before and after exposure is determined. FIG. 2B shows the fringes before and after exposure. The shift of the fringes occurs due to a change in the thickness of the layer of active material on the face 6 of the measuring element 5 after reacting with the test substance.

After determining the difference of the wavelength corresponding to the shift of the interference fringe, before and after exposure, knowing the refractive index of the layer of active material covering the face 6 of the measuring element 5, a change in the layer thickness ΔL is calculated:

$$\Delta L = \left(\frac{L_2 n_2 + L_3 n_3}{n_2}\right)\left(\frac{\lambda + \Delta\lambda}{\lambda} - 1\right)$$

Where :
- $L_2$, $n_2$ denote the thickness and refractive index of the measuring element 5;
- $L_3$, $n_3$ denote the thickness and refractive index of the layer of perfluorinated polymer covering the face 6 of the measuring element 5;
- $\lambda$ is wavelength of analyzed fringe before and after swelling of the layer; and
- $\Delta\lambda$ is the difference in wavelength for the analyzed interference fringe before and after the layer swelling.

If the change in wavelength Δλ of the interference fringe is in a range (0.1 nm to 16.8 nm) towards longer wavelengths, detection of the refrigerant is determined. The range was selected experimentally. In other embodiments of the invention, other ranges and other active materials are suitable for selection to detect other substances. Selection can be done in routine tests. Those skilled in the art will be able to easily use other active materials and measure appropriate ranges for the detection of various substances.

Figure 1B:
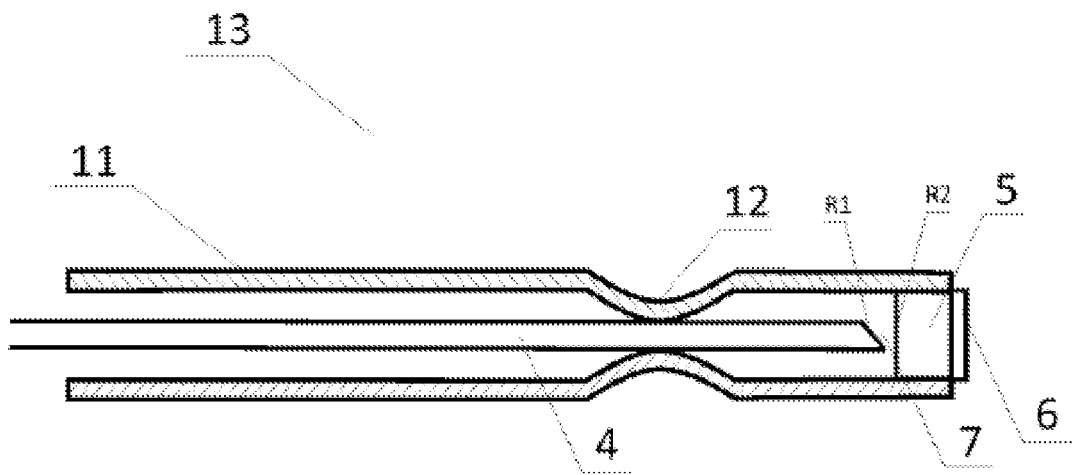
FIG. 1B shows schematically configuration of a probe according an embodiment of the invention.

In the present embodiment, the configuration of the measuring probe 13, according to the inventive disclosure, makes it possible to effectively shorten the residual optical cavity 7. The probe 13 is shown schematically in FIG. 1B. The end of optical fiber 4 and measuring element 5 are placed in a glass capillary having a U-section in the cross-section. The fiber end 4 is cut at an angle of 20° (twenty degrees) and pressed into the measuring element 5. The capillary 11 is sealed by welding at both ends on measuring element 5 and optical fiber 4. The connecting point of capillary 11 with optical fiber 4 should be spaced away from the residual optical cavity 7 to prevent accidental increase of the reflection of one of the layers. This was achieved using a 5 mm long capillary 11.

EXAMPLE 2

An interferometer according to the second embodiment of the invention was made according to the same block diagram illustrated in FIG. 1A. The light source 1 is a narrow-band tunable light source with a central wavelength of 1550 nm tunable in a range of 50 nm. The source 1 is connected to the first port C.1 of circulator 3 via single-mode fiber. A measuring probe 13 is connected to the second port C.2 of the circulator.

Figure 1C:
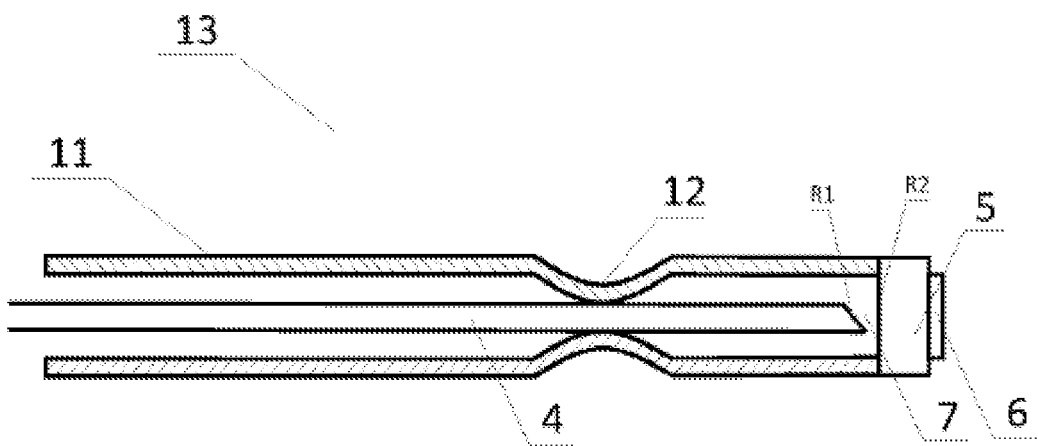
FIG. 1C shows schematically configuration of a probe according another embodiment of the invention.

A measuring probe according to this embodiment of the invention is shown schematically in FIG. 1C. It is interconnected into the optical path of the interferometer with an end of the single-mode optical fiber 4 provided with a connector which is not shown in the figure. The other end of the optical fiber 4 is enclosed in the capillary 11 and pushed against the measuring element 5. The end of the optical fiber 4 housed in the capillary is cut at an angle of 8°. A weld is made between the capillary 11 and the measuring element 5. As a result, between the end of the optical fiber 4 and the measuring element 5, there is an air gap forming a residual cavity 7 (a gap) with an effective width a of 2 μm. The measuring element 5 has a length b of 20 μm. The face 6 of the measuring element 5 is covered with the same material as in example 1.

Detector 2 is connected to the third port C.3 of the circulator.

EXAMPLE 3

A block diagram of an interferometer according to a third exemplary embodiment of the inventive disclosure is the same as in the first and the second embodiment, as shown in FIG. 1A. The light source 1 being a halogen lamp emitting light in a wavelength range from the 400-700 μm, that is connected through a birefringent optical fiber, which maintains polarization and a single mode in the operational wavelength band of the source 1, to the first port C.1 of a circulator 3. The circulator 3 maintains polarization and acts as a dividing element. The second port C.2 of the circulator 3 is connected with measuring probe (13). Optical fiber segment 4 of the optical probe 13 is birefringent and has a beat length of 3 mm at wavelength λ of 550 nm. The optical fiber segment 4 maintains polarization and is single mode in the wavelength operational band of the source 1. The measuring element 5 is made of lead glass having a refractive index equal to 1.8. The third port C.3 of the circulator 3 is connected to a spectroscope that performs the function of a detector 2.

Figure 1D:
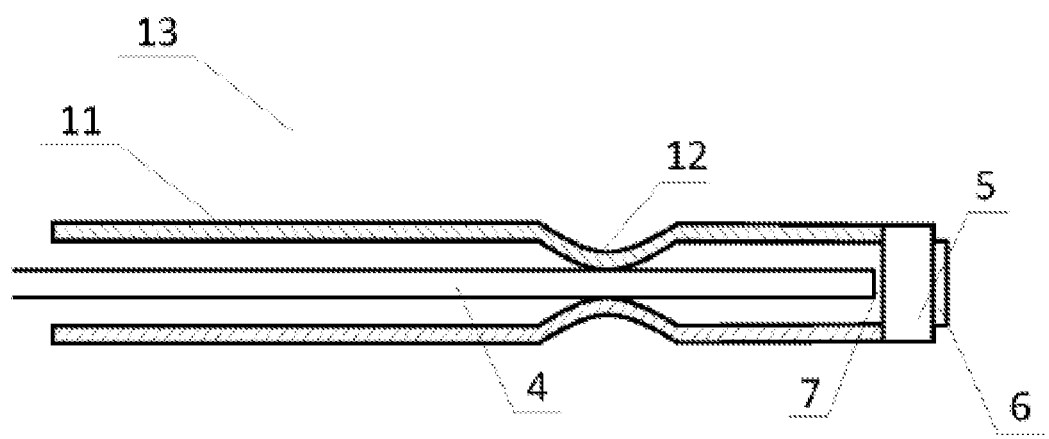
FIG. 1D shows schematically configuration of a probe according yet another embodiment of the invention.

The measurement probe 13 for this exemplary embodiment is shown schematically in FIG. 1D, and includes a capillary 11 having an 0-shaped cross-section and length of 5 mm, into which there is inserted a segment of optical fiber 4 that maintains polarization. Measuring element 5 is made of a lead glass and has a length b of 200 μm. The residual cavity 7 used in this configuration has a length a of 0.1 μm.

Alternatively, measuring element 5 can be made of other substances selected from a group including glass, silica glass, lead glass, ZBLAN glass and polymers, which also provide relatively low losses.

Silica glass is particularly convenient in processing. Using silica glass, it is convenient to manufacture cylindrical measuring element 5 having a desired length and a smooth surface as well as bases (ends) parallel to each other and perpendicular to the axis of the measuring element 5.

Adhesion of the substance to be detected to the face 6 of the measuring element 5 is obtained by placing face 6 in a piranha solution, which is a solution comprising concentrated sulfuric acid and 30% hydrogen peroxide mixed in a volume proportion of 3:1. Thusly processed face 6 is active enough to attract and be covered with a layer of polymer having a refractive index of 1.5 and a thickness of 2 nm thick when exposed to poly(allylamine hydrochloride).

The surface of the lead glass has chemical bonds O—Si—O—Si—O (oxygen-silicon . . . ). After exposure to the piranha solution, the structures of Si—O—Si are transformed to 2 x Si—OH which have more polar character, and consequently attachment of ion polymers to the surface occurs easier.

A layer of 2 nm of material having a refractive index of 1.5 on the face 6 of the measuring element 5 results in shift of spectral refractive fringes by 5 pm (picometers) at wavelength of 550 nm. Consequently the sensor in this embodiment is applicable for detection of poly(allylamine hydrochloride), presence of which is acknowledged when spectral interference fringes are shifted by a value between 2 pm and 0.2 nm towards longer wavelengths.

EXAMPLE 4

Figure 3:
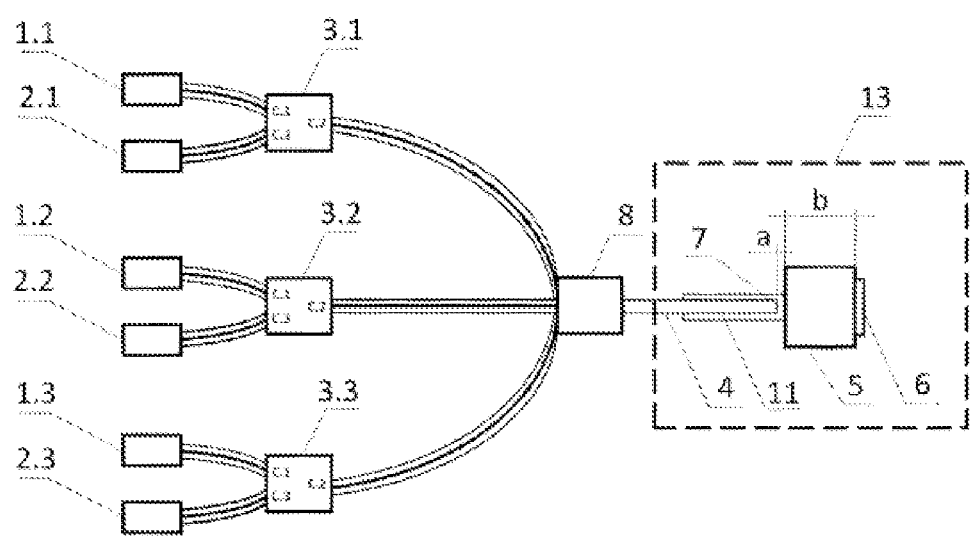
FIG. 3 shows a block diagram of a sensor according to a fourth embodiment of the invention with a multicore (three core) fiber.

In FIG. 3 there is shown a block diagram of a fourth embodiment of the inventive disclosure. Use of measuring probe 13 with a multi-core section of the fiber 4 makes it possible to simultaneously observe the spectrum for different wavelengths of the light source. In the present example, cross section of a three-core optical fiber 4 is shown schematically in FIG. 4. Each core 9.1, 9.2, 9.3 is connected to a separate one of a set of three light sources 1.1, 1.2, 1.3.

In the set of light sources 1.1, 1.2, 1.3, three widespectral superluminescent diodes with wavelengths of 1310 nm, 1450 nm and 1550 nm, respectively, and 50 nm full width variability were used. Each of the sources 1.1, 1.2, 1.3 is connected along a respective detector 2.1, 2.2, 2.3 via a respective circulator 3.1, 3.2, 3.3 in the configuration of the reflection measurement. For each of the detectors 2.1, 2.2, 2.3, a spectrometer was used. The free ports of circulators 3.1, 3.2, 3.3 are connected to the ports of a Fan-in/Fan-out device 8 connecting these ports to a respective one of the cores 9.1, 9.2, 9.3 of the three-core section of optical fiber 4 of the measuring probe 13.

The measuring element 5 has a length b of 50 µm and is made of glass ZBLAN ($ZrF_4$—$BaF_2$—$LaF_3$—$AlF_3$—NaF). Between the ZBLAN glass and the input multi-core fiber 4 there is an air gap formed by the residual cavity 7 with length a of 1 µm. This configuration forms a Fabry-Perot resonator for each of the cores 9.1, 9.2, 9.3.

The face 6 of the measuring element 5 is sensitized to the detection of acetone as a result of immersion in a 1% solution of polystyrene in dichloromethane. The active layer of material remaining on the face 6 after drying has a certain property: it swells as a result of contact with acetone. Consequently, a sensor according to the invention equipped with such a layer can be used as an acetone sensor.

Those skilled in the art will be able to easily determine other sets of sources with other mid-wavelengths and other spectral widths that allow measurements in the range from 1300 to 1500 nm, in which the sensor of the exemplary embodiment has been able to detect and measure the desired substances.

Figure 4:
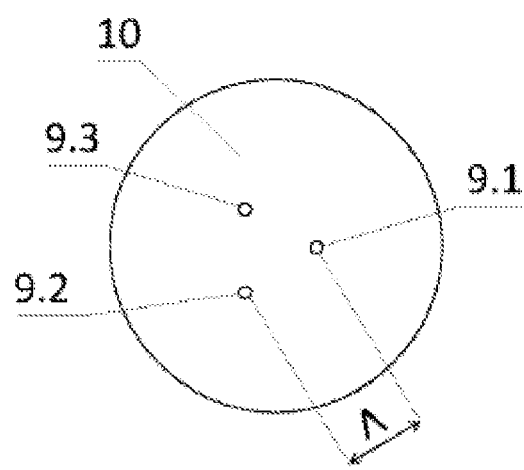
FIG. 4 shows cross-sectional view of this three core fiber.

Light from sources 1.1, 1.2, 1.3 passes through a respective single-mode optical fiber, and is directed to circulators 3.1, 3.2, 3.3, accordingly, and then to the fan-in/fan-out device 8 to the input three-core fiber 4. This optical fiber arranges the cores 9.1, 9.2, 9.3 in a triangular configuration, as shown in FIG. 4, and the lattice constant Λ=80 µm. Cores 9.1, 9.2, 9.3 have diameters of 8.2 µm and numerical apertures of 0.12. From the optical fiber 4 the light is directed to the air filled residual cavity 7 and the measuring element 5. Light reflected from the edge of the measuring element 5, returns via a fiber segment 4, through the fan-in/fan-out element 8, through the single-mode optical fibers and circulators 3.1, 3.2, 3.3 to detectors 2.1, 2.2, 2.3 at which the fringes resulting from interference of light reflected from opposite ends of measuring element 5 are observed. The immersion in acetone at room temperature causes a change in the thickness of the layer on the measuring probe by approx. 200 nm and causes the fringes shift in the vicinity of the 1550 nm wavelength by approx. 6.4 nm, a shift adjacent to the wavelength of 1450 nm at 6 nm, and a shift n the vicinity of the wavelength of 1310 nm by about 5.4 nm. It is acknowledged that acetone was detected if the interference fringe shift obtained at all source wavelengths lies within the range of 0.1 nm to 8.0 nm. Thus, an increase in the specificity of the detection method has been achieved.

Use of a fan-in/fan-out element makes it possible to observe shifts of all of these fringes simultaneously. Improvement of the sensor's operation—higher sensitivity and specificity—is obtained already when observing two fringes. For some of the substances detected, it is advisable to use a fiber with more than three cores and a correspondingly greater number of light sources/detectors—up to ten, 12, or more.

In embodiments of the sensor according to the invention, multi-core fiber sections 4 having a greater number of cores and a corresponding number of light sources and detectors can be used. Such sensor systems and measuring probes are more complicated but they give the possibility to identify the detected substance with more certainty.

In some embodiments of the invention, a fiber optic section may be used as the measuring element 5. Due to the use of the optical fiber segment as a measuring element 5, the diffraction of the light beam is avoided, due to the presence of the core in the optical fiber. The use of optical fiber with a positive dispersion in the light source's bandwidths avoids the occurrence of non-linear phenomena.

Those skilled in the art will be able to routinely propose other advantageous modifications of the optical path between source and detector in some circumstances, without however departing from the invention as defined by the claims. For example, circulators used in the embodiments above can be easily replaced with couplers.

Similarly, one skilled in the art familiarized with the description above is able to propose without difficulty various methods for coating or sensitizing the face 6 of the measuring element 5 to various substances to be detected, and also to select appropriate optical parameters of the source and optical path. Sensitivity to hydrochloric acid can be obtained by preparing a measuring element made of silica glass with a small porosity and refractive index of approx. 1.8 and covering its face with yttrium oxide, by, for example, laser warming of the yttrium oxide and depositing it on glass. Contact of a dissected element with hydrochloric acid causes the fringes shift at a wavelength of 1550 nm by approx. 4 nm.

Those persons skilled in the art are also able to propose various techniques for connecting the measuring probe to the optical path, in particular by splicing the fibers and with dedicated fiber optic connector.

Those persons skilled in the art can easily select the length of the measuring element to the light source band and replace the sources mentioned in the description with various substitutes. The inventors have also successfully used various light sources, including:
- a supercontinuum source;
- a halogen lamp emitting light from the range of 400-700 nm;

a superluminescent diode with central wavelength on 1310 nm;

a superluminescent diode with central wavelength on 1400 nm;

a superluminescent diode with central wavelength on 1450 nm;

a superluminescent diode with central wavelength on 1550 nm;

a narrowband tuned source with central wavelength from range 1310-1550 nm and range of tuning at least 20 nm.

The invention may be embodied using various measuring techniques known to those skilled in the art. Broadband light sources such as superluminescent light emitting diodes, supercontinuum sources, or halogen can be used, and as a detector, a spectrum analyzer or spectrometer can be used. Alternatively, one tunable source can be used, switched during the measurement to the next wavelength. In this configuration, more primitive detectors can be used. There is possibility of analyzing one broadband light signal with several detectors or several sources of narrowband light sources to analyze with one broadband detector.

What is claimed is:

1. A fiber optic measuring probe, comprising:
   an optical fiber segment having an end;
   a measuring element having a first end proximate to the end of the optical fiber segment and second end opposite the first end that is an exposed face;
   wherein there is a residual cavity between the end of the optical fiber segment and the first end of the measuring element, and wherein the optical fiber segment has a length that is at least partly disposed in a capillary at a first end of the capillary, and wherein a second end of the capillary is joined with the measuring element, and wherein the capillary is clenched on the optical fiber segment; and
   wherein the end of the optical fiber segment has a reflection coefficient $R_1$ and the end of the measuring element across the residual cavity has a reflection coefficient $R_2$ where a ratio of $R_1$ to $R_2$ is equal to or less than 0.5.

2. The fiber optic measuring probe of claim 1, wherein a ratio of an optical length of the residual cavity and an optical length of the measuring element is in a range of 0 to 0.4.

3. The fiber optic measuring probe of claim 1, wherein the face of the measuring element is at least partly coated with a material that is adhesive to the chemical substance to be detected.

4. The fiber optic measuring probe of claim 1, wherein the face of the measuring element is at least partly coated with a material that loses adhesiveness when exposed to the chemical substance to be detected.

5. The fiber optic measuring probe of claim 1, wherein the face of the measuring element is at least partly coated with a material that has an optical property that changes when exposed to the chemical substance to be detected.

6. The fiber optic measuring probe of claims 1, wherein he measuring element is made of a material selected of a group including glass, silica glass, lead glass, ZBLAN glass, and polymers.

7. The fiber optic measuring probe of claims 1, wherein an end of the optical fiber segment inside the capillary is formed at an angle relative to an end of the measuring element across the residual cavity, and the angle is in a range of 4° to 20°.

8. The fiber optic measuring probe of claims 1, wherein the optical fiber segment has a connector at a second end, opposite the first end.

9. The fiber optic measuring probe of claims 1, wherein the optical fiber segment is a multicore optical fiber segment.

10. A fiber optic sensor probe, comprising:
    an optical fiber segment having an end;
    a measuring element having a first end proximate to the end of the optical fiber segment and a second end opposite the first end, wherein the second end is at least partially coated with a material that is exposed and that has an optical property, and wherein the optical property of the material changes upon contact with a chemical substance to be detected;
    wherein there is a residual cavity between the end of the optical fiber segment and the first end of the measuring element, wherein the optical fiber segment has a length that is at least partly disposed in a capillary at a first end of the capillary, and wherein a second end of the capillary is joined with the measuring element, wherein the capillary is clenched on the optical fiber segment, and wherein the capillary has a length of at least 5 mm, wherein a ratio of an optical length of the residual cavity and an optical length of the measuring element is in a range of 0 to 0.4.

11. The fiber optic sensor probe of claim 10, wherein the material that is adhesive to the chemical substance to be detected.

12. The fiber optic sensor probe of claim 10, wherein the material that loses adhesiveness when exposed to the chemical substance to be detected.

13. The fiber optic sensor probe of claim 10, wherein the optical property that changes when exposed to the chemical substance to be detected is a reflection coefficient.

14. The fiber optic sensor probe of claims 10, wherein he measuring element is made of a material selected of a group including glass, silica glass, lead glass, ZBLAN glass, and polymers.

15. The fiber optic sensor probe of claims 10, wherein an end of the optical fiber segment inside the capillary is formed at an angle relative to an end of the measuring element across the residual cavity, and the angle is in a range of 4° to 20°.

16. The fiber optic sensor probe of claims 10, wherein the end of the optical fiber segment has a reflection coefficient $R_1$ and the end of the measuring element across the residual cavity has a reflection coefficient $R_2$ where a ratio of $R_1$ to $R_2$ is equal to or less than 0.5.

17. The fiber optic sensor probe of claims 10, wherein the optical fiber segment has a connector at a second end, opposite the first end.

18. The fiber optic sensor probe of claims 10, wherein the optical fiber segment is a multicore optical fiber segment.

* * * * *